United States Patent [19]

Pruess

[11] 4,348,309

[45] Sep. 7, 1982

[54] PREPARATION OF VINYL ESTER RESIN POLYMER SPHERES

[75] Inventor: Warren W. Pruess, Lake Jackson, Tex.

[73] Assignee: The Dow Chemical Company, Midland, Mich.

[21] Appl. No.: 195,564

[22] Filed: Oct. 9, 1980

[51] Int. Cl.³ .............................................. C08K 5/05
[52] U.S. Cl. .................................. 523/336; 523/406; 523/223; 524/459
[58] Field of Search ............................. 260/29.6 WA

[56] References Cited

U.S. PATENT DOCUMENTS 3,301,805 1/1967 Kahrs ................................. 260/29.6
3,799,903 3/1974 Najva ............................. 260/29.6 W

OTHER PUBLICATIONS

Modern Plastics Encyclopedia, p. 102, (1979–1980).

Primary Examiner—Joseph L. Schofer
Assistant Examiner—B. Lipman

[57] ABSTRACT

Spheres of cured vinyl ester resin of a size useful as a flattening agent in paper coating compositions are prepared by a process of adding an aqueous phase containing polyvinyl alcohol to a stirred vinyl ester resin phase containing a free-radical catalyst to form a resin-in-water dispersion followed by addition of a promoter and the resin allowed to cure.

10 Claims, No Drawings

PREPARATION OF VINYL ESTER RESIN POLYMER SPHERES

BACKGROUND OF THE INVENTION

Aqueous polymer latexes have been employed in the formulation of paper coatings. Even with conventional pigments, such coatings have frequently had more gloss than was desired. It is commonplace to incorporate flattening or dulling agents into the composition to reduce that gloss. Typical of such agents are calcined clays or large particle size calcium carbonate.

Macrospherical particles of vinyl ester resins are disclosed in U.S. Pat. No. 3,799,903. A method for preparing such particles is also taught. That process involves the preparation of a three-phase mixture, one of the phases being an inorganic material. The resulting particles were said to be useful for incorporating biologically active materials for controlled release of that active agent.

The need for improved dulling agents in paper coating led to a consideration of vinyl ester resin macrospheres for that purpose. However, it would be desirable to have such spheres capable of existing both with and without inorganic materials. Also, it would be desirable to have a less complicated process for preparing such macrospheres.

SUMMARY OF THE INVENTION

The invention is directed to a process for making macrospherical particles of vinyl ester resins. The process involves, as a first step, the preparation of a polyphase mixture by stirring an aqueous phase containing polyvinyl alcohol into a liquid vinyl ester resin phase containing a free-radical catalyst, the addition of the aqueous phase being such as to form initially a water-in-resin emulsion which, upon addition of further aqueous phase, inverts to a resin-in-water emulsion. As a second step, a promoter is added and the resin cured while maintaining the dispersion by stirring.

The particles may be isolated from the aqueous phase by known techniques or the dispersion may be used as is. The particles are useful as a flattening agent in aqueous latex paper coating compositions.

DETAILED DESCRIPTION OF THE INVENTION

Vinyl ester resins are the terminally unsaturated reaction products of a polyepoxide and an unsaturated monocarboxylic acid. For example, two equivalents of monoacid can be reacted with two equivalents of a diepoxide to produce a vinyl ester resin.

Vinyl ester resins are described in U.S. Pat. No. 3,367,992 to Bearden wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acid such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also described in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as amine, mercaptan and the like, may be utilized in place of the dicarboxylic acid. The preparation of vinyl ester resins is fully disclosed in the above patents.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2000.

Unsaturated monocarboxylic acids include acrylic acid, methacrylic acid, halogenated acrylic or methacrylic acids, cinnamic acid and the like, and mixtures thereof, and hydroxyalkyl acrylate or methacrylate half esters of dicarboxylic acids as described in U.S. Pat. No. 3,367,992 wherein the hydroxyalkyl group preferably has from two to six carbon atoms.

The vinyl ester resins are commonly formulated with a liquid copolymerizable monomer usually to reduce the viscosity of the resin. Such monomers, sometimes called "reactive diluents," are commonly employed in an amount of from 20 to 60 percent based on the combined weight of the monomer plus resin.

A variety of copolymerizable monomers are available and suitable and include alkenyl aromatic monomers, alkyl esters of acrylic and methacrylic acid, vinyl acetate, acrylonitrile, diallyl maleate, diallyl phthalate, acrylic and methacrylic acid and the like and mixtures thereof. Preferred are the alkenyl aromatic monomers such as styrene, α-methyl styrene, vinyl toluene, alkyl substituted styrenes such as t-butyl styrene, etc., halogen substituted styrenes such as chlorostyrene, dichlorostyrene, and the like.

The polyvinyl alcohol should be water soluble and may be of any viscosity grade although the low to medium viscosity grades are preferred.

If it is desired to increase the sphere density, finely divided materials such as clay and metal dust may be included in the recipe.

The amount of resin can be an amount up to 55 weight percent. If sphere densifying solids are not employed, the proportion of resin is preferably 45 to 55 weight percent. The amount of water is at least 45 weight percent to be able to invert the emulsion to a resin-in-water dispersion. An excess of water does not interfere with sphere formation. The polyvinyl alcohol is used in an amount of 0.25 to 7 weight percent. Lower concentrations result in larger sphere diameters. Larger concentrations than 7 percent increase problems with foam and also agglomeration of spheres upon curing. The optimum concentration is about 3 weight percent which might vary slightly depending on the viscosity of the polyvinyl alcohol employed.

The catalyst and promoter concentrations are those commonly employed in curing vinyl ester resins which are generally in the range for each component of about 0.1 to 2 percent based on the weight of resin plus water. The catalyst will usually be in larger concentration than the promoter being in the range of 0.5 to 2 percent while the promoter is 0.1 to 0.5 percent. As is known in the art, the concentration to be used will vary with the identity of the catalyst and promoter and on other known factors. Typical catalysts are free-radical catalysts such as benzoyl peroxide, lauroyl peroxide, t-butyl hydroperoxide, methyl ethyl ketone peroxide, t-butyl perbenzoate and others. Typical promoters include lead or cobalt naphthenate, N,N-dimethylaniline, N,N-dimethyltoluidine and others known to accelerate the activity of free-radical catalysts.

The process is a multi-step procedure wherein an aqueous phase, containing polyvinyl alcohol, is slowly added to a stirred resin phase, preferably containing the catalyst, to form initially a water-in-resin emulsion. Continued addition of aqueous phase causes that emulsion to invert to a resin-in-water emulsion. In yet another step, the promoter is added to the emulsion and curing caused to occur preferably by heating the emulsion to from 65° to 85° C.

Although stirring is unnecessary during the curing step, it does help to promote uniform sphere sizes when used. Stirring is needed in the steps of forming the emulsion.

Particle size of the macrospherical particles may be varied depending on the speed and shear employed in making the polyphase mixture and on the proportions of the components in said mixture. Smaller particle size is favored by increasing the shear and vice versa. Particles as small as 5 to 10 microns and as large as ⅜ inch may be prepared.

Generally, the macrospherical particles have an average particle size ranging from about 10 to 20 microns. The density of the macrospherical particles may be increased by the addition of lead compounds, iron dust, small amounts of kaolin clay, magnesium or aluminum dust and the like. The particles may also be pigmented by the addition of same.

It is to be understood that the macrospherical particles of this invention may contain small amounts of the inorganic material and/or droplets of the water phase.

After curing, the macrospherical product slurry may be employed directly without recovering said particles, postcured or dried. The slurry may be further diluted, if desired, and sprayed if the macrospheres contain an insecticide, for example, or the slurry may be directly added to a latex paint if the macrospheres contain a fungicide or bactericide or the like. Alternately, the slurry may be water washed and/or given an acid wash to recover the macrospherical particles. Excess water may be removed by drying in any convenient manner.

The concept of the invention is illustrated by the following non-limiting examples.

EXAMPLE 1

An emulsion was prepared from 1076 grams water, 54 grams of a 20 percent aqueous solution of polyvinyl alcohol sold commercially as Vinol 523, 1000 grams of a vinyl ester resin diluted with 45 percent styrene, the vinyl ester resin being a dimethacrylate of the diglycidyl ether of bisphenol A sold commercially as Derakane ® 411-45 and 20 grams benzoyl peroxide sold commercially as BFF 50.

The vinyl ester resin and benzoyl peroxide were mixed in one container. The polyvinyl alcohol was dissolved in the water in another container.

While agitating the resin phase under high shear with a Gifford-Wood homogenizer mixer, the aqueous portion was gradually added which initially formed a water-in-resin emulsion. As the resin/water ratio approached unity, the emulsion inverted to a resin-in-water emulsion. The emulsion was removed from the mixer and 2 grams of N,N-dimethyl toluidine were added and admixed. In about 12 minutes, the polymer spheres exothermed and cured. The spheres were washed and screened through a mechanical sieve. The sphere diameters ranged in diameter from 0.6 to 28 microns with an average of 14 microns.

EXAMPLE 2

Spheres were prepared from a recipe consisting of 15 pounds (6.8 kilograms) water, 85.1 grams of a 20 percent aqueous solution of Vinol 523, polyvinyl alcohol, 15 pounds (6.8 kilograms) of Derakane ® 411-45 and 136 grams benzoyl peroxide sold commercially as BFF 50.

The procedure was the same as that of Example 1 except that a Cowles dissolver was used in place of the homogenizer mixer.

After the resin-in-water emulsion was formed, 2 grams of N,N-dimethyl toluidine was added with continuous stirring at slow speed. The slurry of spheres was set aside and allowed to cure. Sphere diameters ranged from 1 to 10 microns with an average of 1.55 microns.

EXAMPLE 3

The recipe was 817 grams of water, 52 grams of Vinol 523 polyvinyl alcohol, 1000 grams of Derakane ® 411-45 vinyl ester resin and 20 grams benzoyl peroxide (BFF 50).

Spheres were prepared as in Example 1 using 2 grams of N,N-dimethyl toluidine as the promoter and the slurry allowed to cure without agitation. The spheres fused and formed a caked mass.

EXAMPLE 4

Example 3 was repeated except that the slurry was stirred continuously through the cure cycle and cold water was added to quench the exotherm.

Spheres were produced having diameters in the range of 0.5 to 22 microns with an average of 2 microns.

EXAMPLE 5

The recipe was 695.2 grams of water, 173.8 grams of a 20 percent aqueous solution of Vinol 523 polyvinyl alcohol, 1000 grams of Derakane ® 411-45 vinyl ester resin and 20 grams benzoyl peroxide (BFF 50).

Spheres were prepared by the procedure of Example 4. The product was then screened through mechanical sieves to remove irregular particles and the slurry neutralized with 0.1 N sodium hydroxide.

Spheres were obtained with diameters in the range of 0.5 to 10 microns with an average of 2 microns.

EXAMPLE 6

The procedure of Example 1 was repeated to compare the use of polyvinyl alcohol as a dispersant with barium carbonate or calcium carbonate or no dispersant. The batch volume was varied in some instances. It has been determined that as batch volume increases, a given percentage of dispersant will be less efficient. In all but one case, the ratio of resin to water was 1:1.

The results are shown in Table I.

TABLE I

| No. | Batch Volume (ccs) | Dispersant | % Dispersant | Sphere Diameter Range | Average Sphere Diameter Microns |
|---|---|---|---|---|---|
| For Comparison | | | | | |
| 1 | 1000 | None | — | Solid Polymer - No Spheres | |
| 2 | 1000 | $BaCO_3$ | 50[1] | Solid Polymer - No Spheres | |
| 3 | 1000 | $CaCO_3$ | 60[1] | 25–125 | 80 |
| 4 | 2000 | $CaCO_3$ | 95[1] | 15–160 | 85 |
| This Invention | | | | | |
| 5 | 2000 | PVA | 0.75[2] | 1–75 | 35 |
| 6 | 30 Pounds (13.6 Kg) | PVA | 0.25[2] | 1–310 | 155 |
| 7 | 2000[3] | PVA | 1.0[2] | 0.6–28 | 14 |

[1] Percent by weight in resin.
[2] Percent in water.
[3] Resin/water ratio was 1:1.1.

EXAMPLE 7

The procedure of Example 1 was repeated using various concentrations of polyvinyl alcohol as the dispersant.

The results are shown in Table II.

TABLE II

| Emulsion Components | | Results | | |
|---|---|---|---|---|
| Resin/Water Ratio | % PVA In Water | Sphere Diameter Range, μ | Average Sphere Diameter, μ | Redispersibility |
| 0.9:1 | 1.0 | 0.6–28 | 14 | Poor |
| 1.1:1 | 1.5 | 0.5–10 | 2 | Poor |
| 1.2:1 | 1.2 | 0.5–22 | 2 | Poor |
| 1.2:1 | 2.0 | 0.5–20 | 2 | Poor |
| 1.2:1 | 3.0 | 0.5–10 | 2 | Excellent |
| 1.2:1 | 4.0 | 0.5–10 | 2 | Good |

Spheres produced using up to 2 percent PVA in water tend to settle and form a cake, while stored in water. Redispersion of the spheres requires vigorous agitation.

Spheres produced using 3 percent and 4 percent PVA in water settle also but redisperse quite readily upon shaking. Spheres tend to agglomerate after polymerization within a 4 percent PVA in water solution.

Spheres in the range of 0.5–10μ in diameter have yielded good results after evaluation as a dulling agent for plastic pigmented paper coatings.

What is claimed is:

1. A process for preparing a slurry of macrospherical thermoset resin particles which comprises:
   (a) making a polyphase mixture by stirring (1) an aqueous phase containing at least 0.25 weight percent polyvinyl alcohol into (2) a vinyl ester resin phase containing a free-radical polymerization catalyst to form an initial water-in-resin emulsion which inverts to a resin-in-water emulsion, said vinyl ester resin being a terminally unsaturated reaction product of an epoxide and a compound containing a group which is reactive with the epoxide, and
   (b) adding a promoter and
   (c) then curing the resin particles while the mixture is stirred.

2. The process of claim 1 wherein the aqueous phase constitutes at least 45 weight percent of the combined weight of resin and aqueous phases.

3. The process of claim 1 wherein said polyvinyl alcohol is present in an amount of from 0.25 to 7 weight percent based on the weight of the water.

4. The process of claim 1 wherein said vinyl ester resin is the diacrylate ester of a diglycidyl ether.

5. The process of claim 4 wherein said diglycidyl ether is the diglycidyl ether of bisphenol A.

6. The process of claim 1 wherein said vinyl ester resin phase is a blend of a diacrylate ester of a diglycidyl ether and a copolymerizable monomer.

7. The process of claim 6 wherein said diacrylate ester is present in an amount of from 40 to 70 weight percent and said copolymerizable monomer is present in an amount of 30 to 60 weight percent of said vinyl ester resin phase.

8. The process of claim 1 wherein said catalyst is an organic peroxide.

9. The process of claim 8 wherein said organic peroxide is benzoyl peroxide.

10. The process of claim 1 wherein said promoter is N,N-dimethyl toluidine.

* * * * *